United States Patent
Sodagar (10) Patent No.: US 11,792,249 B2
(45) Date of Patent: Oct. 17, 2023

(54) EVENT-DRIVEN PROVISIONING OF NEW EDGE SERVERS IN 5G MEDIA STREAMING ARCHITECTURE

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 18/080,195

(22) Filed: Dec. 13, 2022

(65) Prior Publication Data

US 2023/0254356 A1 Aug. 10, 2023

Related U.S. Application Data

(60) Provisional application No. 63/307,546, filed on Feb. 7, 2022.

(51) Int. Cl.
*H04L 65/65* (2022.01)
*H04L 65/75* (2022.01)
*H04L 65/1063* (2022.01)

(52) U.S. Cl.
CPC .......... *H04L 65/65* (2022.05); *H04L 65/1063* (2013.01); *H04L 65/75* (2022.05)

(58) Field of Classification Search
CPC ............. H04L 65/1016; H04L 65/1063; H04L 65/1026; H04L 65/1036; H04L 67/56; H04W 4/50
See application file for complete search history.

(56) References Cited

U.S. PATENT DOCUMENTS

| 2016/0112953 | A1* | 4/2016 | Go ............................ H04L 65/65 370/329 |
| 2017/0134453 | A1 | 5/2017 | Duerring |
| 2019/0213860 | A1* | 7/2019 | Shaprio ................. H04W 4/029 |
| 2021/0258217 | A1 | 8/2021 | Chen et al. |
| 2021/0320955 | A1 | 10/2021 | Kolan |
| 2021/0344998 | A1 | 11/2021 | Sodagar |

(Continued)

OTHER PUBLICATIONS

International Search Report dated Apr. 5, 2023 issued in International Application No. PCT/US 22/52942.

(Continued)

*Primary Examiner* — Hitesh Patel
(74) *Attorney, Agent, or Firm* — Sughrue Mion, PLLC (57) ABSTRACT

A method for event-driven provisioning of edge servers in a 5G Media Streaming (5GMS) architecture, including setting, by a 5GMS AP, during provisioning or updating of a first EAS one or more event trigger conditions and determining, by a 5GMS AF at the first EAS, based on an indicator event associated with the first EAS, that at least one of the one or more event trigger conditions of the first EAS is satisfied. Generating, by the 5GMS AP, a trigger event in response and setting, by the 5GMS AP, during the provisioning or updating of a second EAS, one or more activating conditions for activating the second EAS. The 5GMS AP determining that the generated trigger event is associated with at least one of the activating conditions for activating the second EAS; and transmitting a message causing activation of the second EAS.

18 Claims, 6 Drawing Sheets

(56) References Cited

U.S. PATENT DOCUMENTS

2021/0352113 A1  11/2021  Sodagar
2022/0321610 A1* 10/2022  Sodagar .............. H04L 65/1069

OTHER PUBLICATIONS

Written Opinion dated Apr. 5, 2023 issued in International Application No. PCT/US 22/52942.

"3rd Generation Partnership Project; Technical Specification Group Services and System Aspects; Architecture for enabling Edge Applications; (Release 17)", 3GPP TS 23.558 V17.2.0, Dec. 2021, 163 pages.

"3rd Generation Partnership Project; Technical Specification Group Services and System Aspects; 5G Media Streaming (5GMS); General description and architecture (Release 16)", 3GPP TS 26.501 V16.8.0, Jun. 2021, 79 pages.

"3rd Generation Partnership Project; Technical Specification Group Core Network and Terminals; Enabling Edge Applications; Application Programming Interface (API) specification; Stage 3; (Release 17)", 3GPP TS 29.558 V1.3.0, Jan. 2022, 190 pages.

* cited by examiner

EVENT-DRIVEN PROVISIONING OF NEW EDGE SERVERS IN 5G MEDIA STREAMING ARCHITECTURE

CROSS-REFERENCE TO RELATED APPLICATION

This application claims priority from U.S. Provisional Application No. 63/307,546, filed on Feb. 7, 2022, in the United States Patent and Trademark Office, the disclosure of which is incorporated herein by reference in its entirety.

FIELD

The disclosure generally relates to $5^{th}$ generation (5G) media streaming (5GMS), and, in particular, to provisioning new edge application servers based on set events.

BACKGROUND

The $3^{rd}$ Generation Partnership Project (3GPP) recently provided an extension to use the edge servers in 5G media streaming (5GMS) architecture. However, the detailed methods of provisioning these edge servers are not defined yet.

The $3^{rd}$ Generation Partnership Project (3GPP) TS23.558 defines the general architecture for enabling edge application, including the discovery of hardware capabilities of an edge element and the discovery of the edge application by Application clients. 3GPP TS 26.501 defines the general architecture for 5G media streaming applications. It recently added the use of TS23.558 edge architecture as part of the 5GMSA architecture as an extension.

However, the actual method of provisioning such services is not defined. This disclosure defines a provisioning method of new edge servers based on the triggering events of the running edge servers.

SUMMARY

According to one or more embodiments, a method for event-driven provisioning of edge servers in a 5G Media Streaming (5GMS) architecture may be provided. The method may be executed by at least one processor, and may include, setting, by a 5GMS application provider (AP), during provisioning or updating of a first edge application server (EAS), one or more event trigger conditions; determining, by a 5GMS Application Function (AF) at the first EAS, based on an indicator event associated with the first EAS, that at least one of the one or more event trigger conditions of the first EAS is satisfied; generating, by the 5GMS AP, a trigger event in response to determining that the at least one of the event trigger conditions of the first EAS is satisfied; setting, by the 5GMS AP, during the provisioning or updating of a second EAS, one or more activating conditions for activating the second EAS; determining, by the 5GMS AP, that the generated trigger event is associated with at least one of the one or more activating conditions for activating the second EAS; and transmitting a message associated with the generated trigger event to EASs in the 5GMS architecture, the message causing activation of the second EAS.

According to one or more embodiments, a device for event-driven provisioning of edge servers in a 5G Media Streaming (5GMS) architecture may be provided. The device may include at least one memory configured to store program code; and at least one processor configured to read the program code and operate as instructed by the program code. The program code may include, first setting code configured to cause the at least one processor to set, by a 5GMS application provider (AP), during provisioning or updating of a first edge application server (EAS), one or more event trigger conditions; first determining code configured to cause the at least one processor to determine, by a 5GMS Application Function (AF) at the first EAS, based on an indicator event associated with the first EAS, that at least one of the one or more event trigger conditions of the first EAS is satisfied; generating code configured to cause the at least one processor to generate, by the 5GMS AP, a trigger event in response to determining that the at least one of the event trigger conditions of the first EAS is satisfied; second setting code configured to cause the at least one processor to set, by the 5GMS AP, during the provisioning or updating of a second EAS, one or more activating conditions for activating the second EAS; second determining code configured to cause the at least one processor to determine, by the 5GMS AP, that the generated trigger event is associated with at least one of the one or more activating conditions for activating the second EAS; transmitting code configured to cause the at least one processor to transmit a message associated with the generated trigger event to EASs in the 5GMS architecture, the message causing activation of the second EAS.

According to one or more embodiments, a non-transitory computer-readable medium stores instructions may be provided. The instructions may include one or more instructions that, when executed by one or more processors of a device for event-driven provisioning of edge servers in a 5G Media Streaming (5GMS) architecture, cause the one or more processors to set, by a 5GMS application provider (AP), during provisioning or updating of a first edge application server (EAS), one or more event trigger conditions; determine, by a 5GMS Application Function (AF) at the first EAS, based on an indicator event associated with the first EAS, that at least one of the one or more event trigger conditions of the first EAS is satisfied; generate, by the 5GMS AP, a trigger event in response to determining that the at least one of the event trigger conditions of the first EAS is satisfied; set, by the 5GMS AP, during the provisioning or updating of a second EAS, one or more activating conditions for activating the second EAS; determine, by the 5GMS AP, that the generated trigger event is associated with at least one of the one or more activating conditions for activating the second EAS; and transmit a message associated with the generated trigger event to EASs in the 5GMS architecture, the message causing activation of the second EAS.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
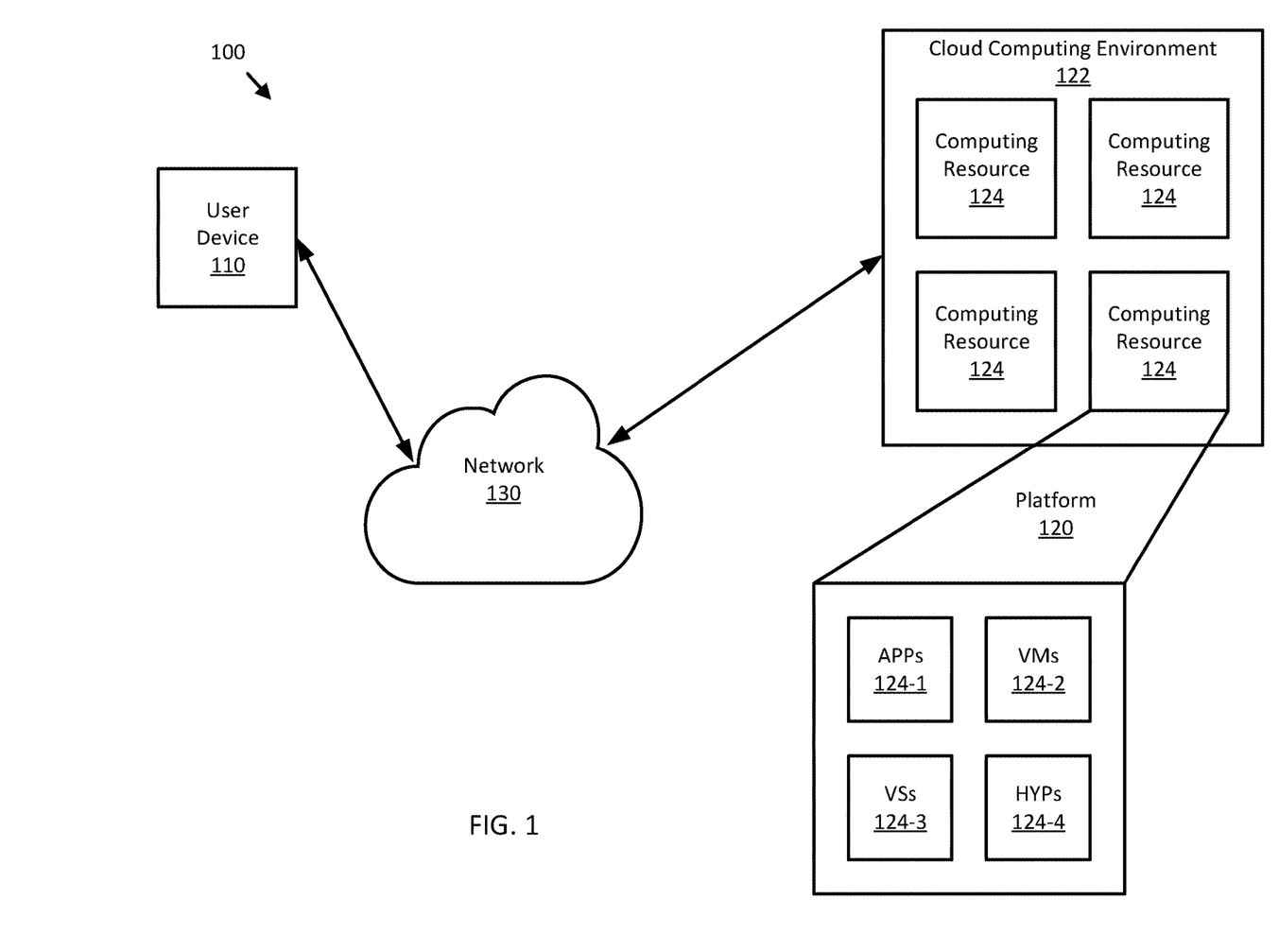
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
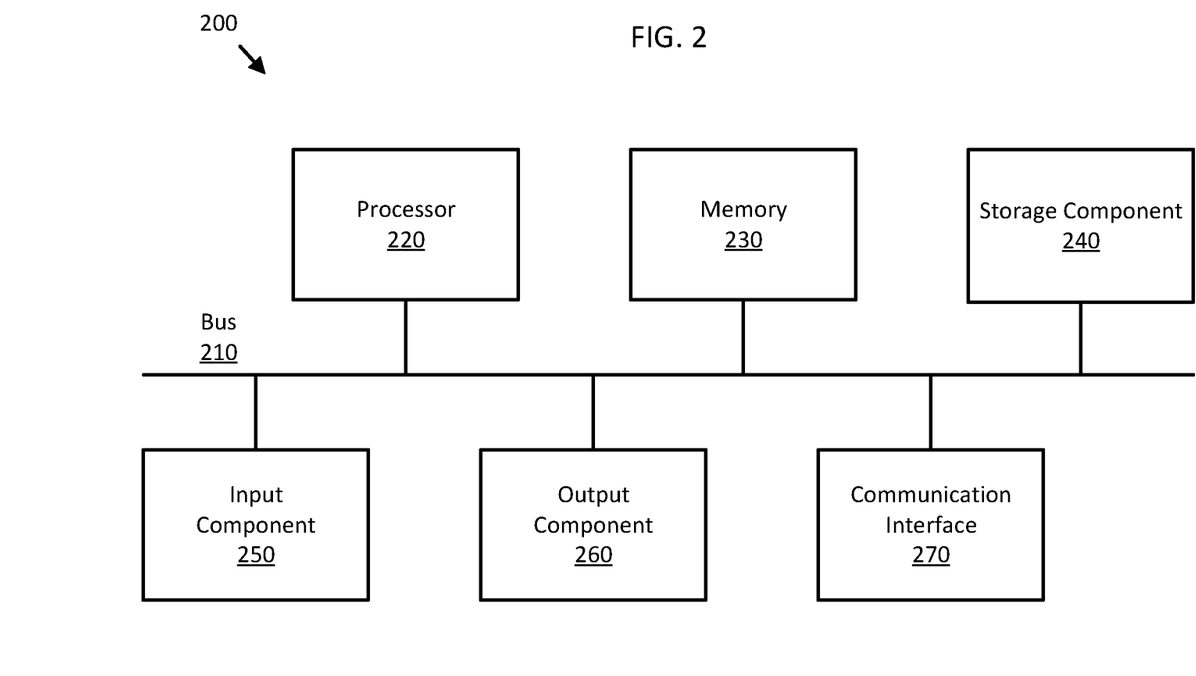
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/ Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/ NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Figure 3:
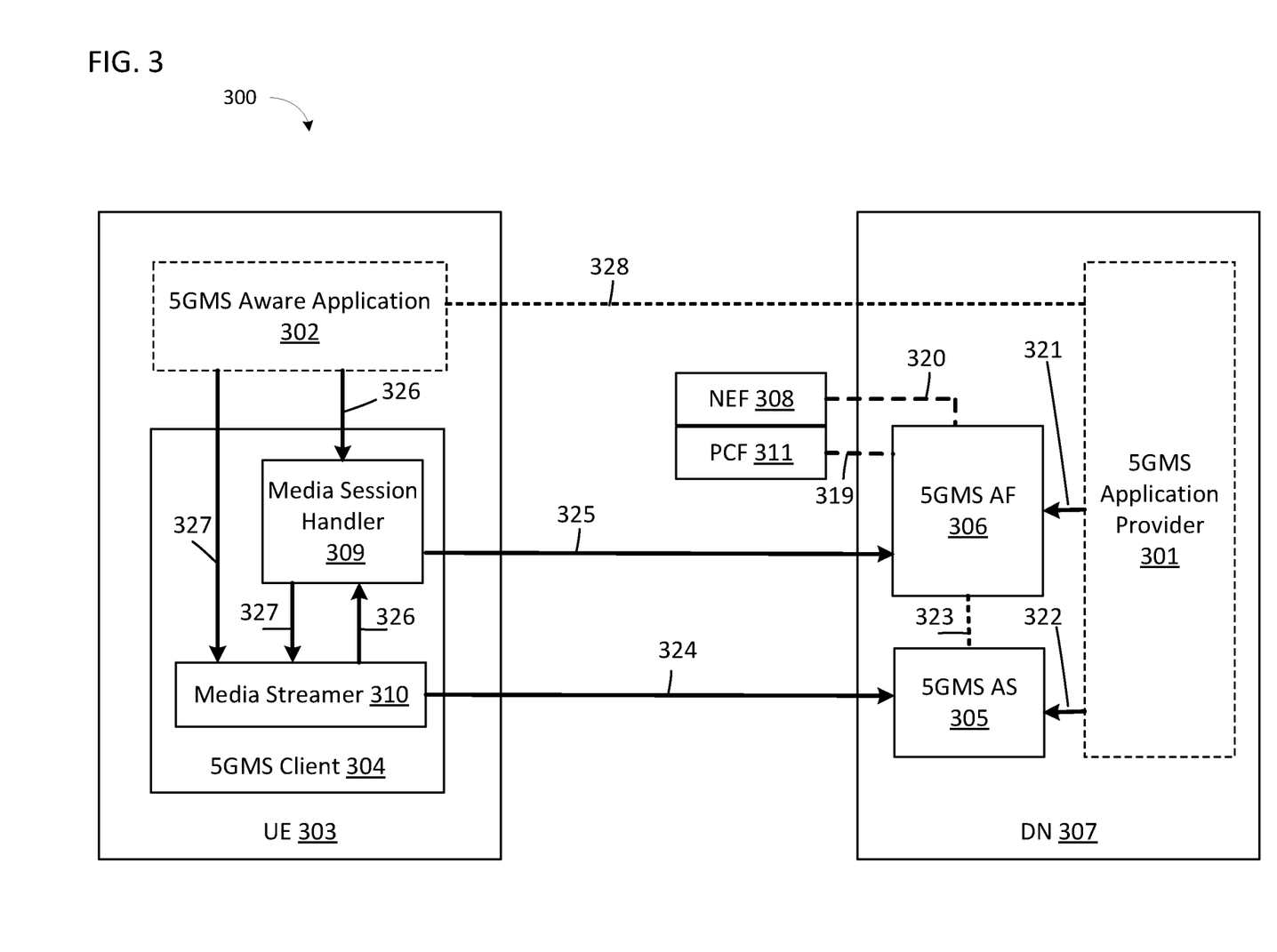
FIG. 3 is a block diagram of a media architecture for media streaming, according to embodiments.

FIG. 3 is a diagram of a media architecture 300 for media streaming according to embodiments. A 5GMS Application Provider 301 may use 5GMS for uplink streaming services or downlink streaming services. 5GMS Application provider 301 may provide a 5GMS Aware Application 302 on the UE 303 to make use of 5GMS Client 304 and network functions using interfaces and defined in 5GMS. The 5GMS Aware Application 302 may contain the service logic of the 5GMS application service, and may interact with other 5GMS client and network functions via the interfaces and APIs defined in the 5GMS architecture. 5GMS AS 305 may be an AS dedicated to 5G Media Uplink Streaming. 5GMS Client 304 may be a UE 303 internal function dedicated to 5G Media Uplink Streaming.

5GMS AF 306 and 5GMS AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the NEF 308 using link 320.

The media architecture 300 may connect UE 303 internal functions and related network functions for 5G Media Uplink Streaming. Accordingly, media architecture 300 may include a number of functions. For example, 5GMS Client 304 on UE 303 may be an originator of 5GMS service that may be accessed through interfaces/APIs. 5GMS Client 304 may include two sub-functions, media session handler 309 and media streamer 310. Media session handler 309 may communicate with the 5GMS AF 306 in order to establish, control and support the delivery of a media session. The Media Session Handler 309 may expose APIs that can be used by the 5GMS Aware Application 302. Media Streamer 310 may communicate with 5GMS AS 305 in order to stream the media content and provide a service to the 5GMS Aware Application 302 for media capturing and streaming, and the Media Session Handler 309 for media session control. 5GMS Aware Application 302 may control 5GMS Client 304 by implementing external application or content service provider specific logic and enabling the establishment of a media session. 5GMS AS 305 may host 5G media functions and may be implemented as a content delivery network (CDN), for example. 5GMS Application Provider 301 may be an external application or content specific media functionality, e.g., media storage, consumption, transcoding and redistribution that uses 5GMS to stream media from 5GMS Aware Application 302. 5GMS AF 306 may provide various control functions to the Media Session Handler 309 on the UE 303 and/or to 5GMS Application Provider 301. 5GMS AF 306 may relay or initiate a request for different PCF 311 treatment or interact with other network functions. The 5GMS AF 306 may be connected to the PCF 311 by an N5 interface 319.

Media architecture 300 may include a number of different interfaces. For example, link 321 may relate to M1u, which may be a 5GMS Provisioning API exposed by 5GMS AF 306 to provision usage of media architecture 300 and to obtain feedback. Link 322 may relate to M2u, which may be a 5GMS Publish API exposed by 5GMS AS 305 and used when 5GMS AS 305 in trusted DN, such as DN 307, is selected to receive content for streaming service. Link 323 may relate to M3u, which may be an internal API used to exchange information for content hosting on 5GMS AS 305 within a trusted DN such as DN 307. Link 324 may relate to M4u, which may be a Media Uplink Streaming API exposed by 5GMS AS 323 to Media Streamer 310 to stream media content. Link 325 may relate to M5u, which may be a Media Session Handling API exposed by 5GMS AF 305 to Media Session Handler for media session handling, control and assistance that also include appropriate security mechanisms e.g. authorization and authentication. Link 326 may relate to M6u, which may be a UE 303 Media Session Handling API exposed by Media Session Handler 309 to 5GMS Aware Application 302 to make use of 5GMS functions. Link 327 may relate to M7u, which may be a UE Media Streamer API exposed by Media Streamer 310 to 5GMS Aware Application 302 and Media Session Handler 309 to make use of Media Streamer 310. Link 328 may relate to M8u, which may be an Application API which is used for information exchange between 5GMS Aware Application 302 and 5GMS Application Provider 301, for example to provide service access information to the 5GMS Aware Application 302. The UE 303 may also be implemented in a self-contained manner such that interfaces M6u 326 and M7u 327 are not exposed.

Figure 4:
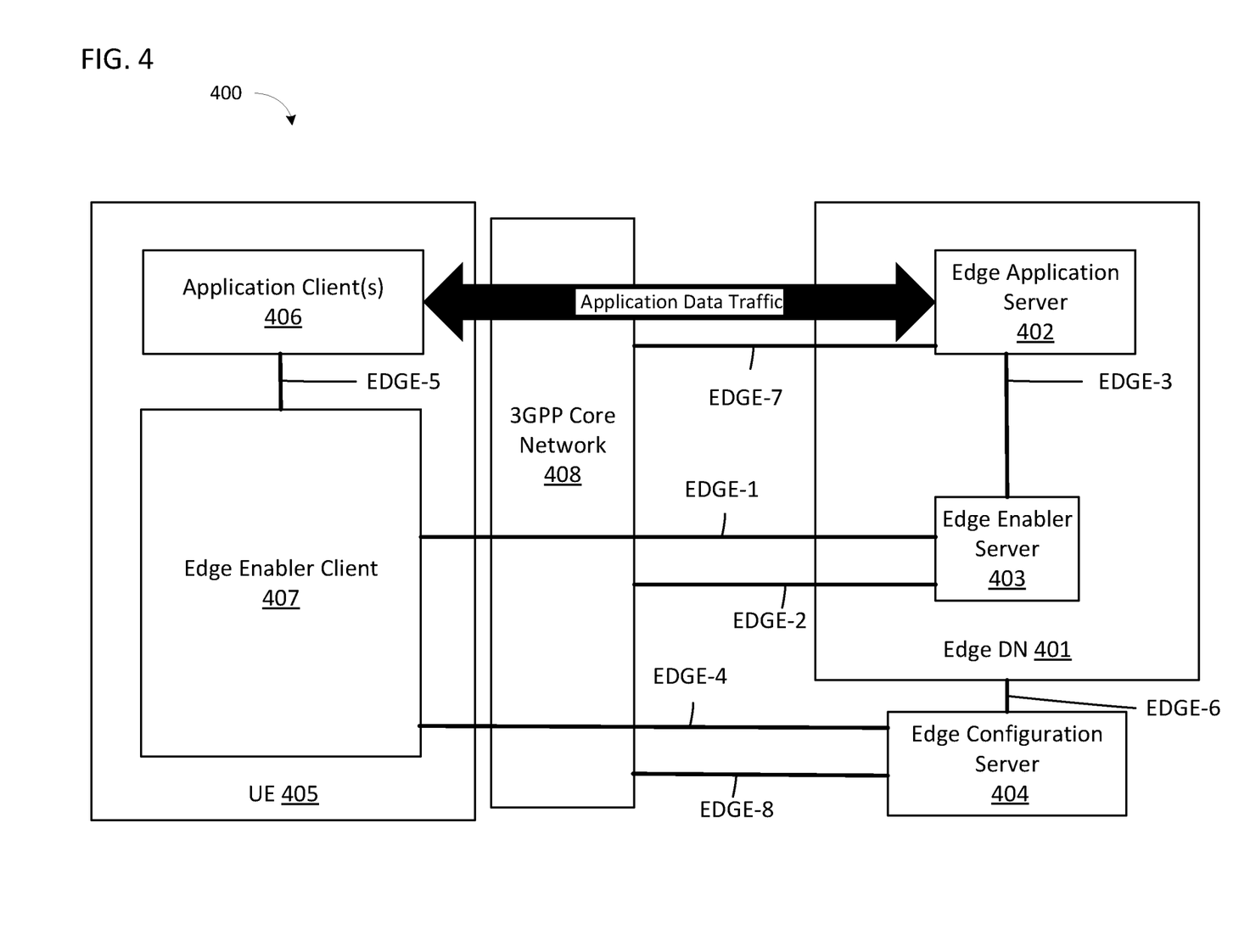
FIG. 4 is a diagram of a $5^{th}$ generation (5G) edge network architecture, according to embodiments.

FIG. 4 is a diagram of a 5G edge network architecture 400, according to embodiments. Edge Data Network (EDN) 401 is a local Data Network. Edge Application Server (EAS) 402 and Edge Enabler Server (EES) 403 are contained within the EDN 401. Edge Configuration Server (ECS) 404 provides configurations related to EES 403, including details of EDN 401 hosting EES 403. User Equipment (UE) 405 contains Application Client (AC) 406 and Edge Enabler Client (EEC) 407. EAS 402, EES 403 and ECS 404 may interact with the 3GPP Core Network 408.

EES 403 provides supporting functions needed for EAS 402 and EEC 407. Functionalities of EES 403 may include: provisioning of configuration information to EEC 407, enabling exchange of application data traffic with EAS; supporting the functionalities of API invoker and API exposing function, for example as specified in 3GPP TS 23.222; interacting with 3GPP Core Network 408 for accessing the capabilities of network functions either directly (e.g. via PCF) or indirectly (e.g. via Service Capability Exposure Function (SCEF)/NEF/SCEF+NEF); supporting the functionalities of application context transfer; supporting external exposure of 3GPP network and service capabilities to EASs 402 over link EDGE-3; supporting the functionalities of registration (i.e., registration, update, and de-registration) for EEC 407 and EAS; and supporting the functionalities of triggering EAS 402 instantiation on demand.

EEC 407 provides supporting functions needed for AC. Functionalities of EEC 407 may include: retrieval and provisioning of configuration information to enable the exchange of Application Data Traffic with EAS 402; and discovery of EASs 402 available in the EDN 401.

ECS 404 provides supporting functions needed for the EEC 407 to connect with an EES 403. Functionalities of ECS 404 are: provisioning of Edge configuration information to the EEC 407, for example the information for the EEC 407 to connect to the EES 403 (e.g. service area information applicable to LADN); and the information for establishing a connection with EESs 403 (such as URI); supporting the functionalities of registration (i.e., registration, update, and de-registration) for the EES 403; supporting the functionalities of API invoker and API exposing function as specified in 3GPP TS 23.222; and interacting with 3GPP Core Network 408 for accessing the capabilities of network functions either directly (e.g. PCF) or indirectly (e.g. via SCEF/NEF/SCEF+NEF).

AC 406 is the application resident in the UE 405 performing the client function.

EAS 402 is the application server resident in the EDN 401, performing the server functions. The AC 406 connects to EAS 402 in order to avail the services of the application with the benefits of Edge Computing. It is possible that the server functions of an application are available only as an EAS 402. However, it is also possible that certain server functions are available both at the edge and in the cloud, as an EAS 402 and an Application Server resident in the cloud respectively. The server functions offered by an EAS 402 and its cloud Application Server counterpart may be the same or may differ; if they differ, the Application Data Traffic exchanged with the AC may also be different. EAS 402 may consume the 3GPP Core Network 408 capabilities in different ways, such as: it may invoke 3GPP Core Network 408 function APIs directly, if it is an entity trusted by the 3GPP Core Network 408; it may invoke 3GPP Core Network 408 capabilities through EES 403; and it may invoke the 3GPP Core Network 408 capability through the capability exposure functions e.g., SCEF or NEF.

Architecture 400 may include a number of different interfaces for enabling edge applications, which may be referred to as reference points. For example, link EDGE-1 may be a reference point which enables interactions between the EES 403 and the EEC 407. It supports: registration and de-registration of EEC 407 to EES 403; retrieval and provisioning of EAS 402 configuration information; and discovery of EASs 402 available in the EDN 401.

Link EDGE-2 may be a reference point which enables interactions between EES 403 and the 3GPP Core Network 408. It supports: access to 3GPP Core Network 408 functions and APIs for retrieval of network capability information, e.g. via SCEF and NEF APIs as defined in 3GPP TS 23.501, 3GPP TS 23.502, 3GPP TS 29.522, 3GPP TS 23.682, 3GPP TS 29.122; or with EES 403 deployed within the MNO trust domain (see 3GPP TS 23.501 clause 5.13, 3GPP TS 23.503, 3GPP TS 23.682). Link EDGE-2 may reuse 3GPP reference points or interfaces of EPS or 5GS considering different deployment models.

Link EDGE-3 may be a reference point which enables interactions between EES 403 and EASs 402. It supports: registration of EASs 402 with availability information (e.g. time constraints, location constraints); de-registration of EASs 402 from EES 403; discovery of target EAS 402 information to support application context transfer; providing access to network capability information (e.g. location information, Quality of Service (QoS) related information); and requesting the setup of a data session between AC and EAS 402 with a specific QoS.

Link EDGE-4 may be a reference point which enables interactions between ECS 404 and EEC 407. It supports: provisioning of Edge configuration information to the EEC 407.

Link EDGE-5 may be a reference point which enables interactions between AC and EEC 407.

Link EDGE-6 may be a reference point which enables interactions between ECS 404 and EES 403. It supports: registration of EES 403 information to ECS 404.

Link EDGE-7 may be a reference point which enables interactions between EAS 402 and the 3GPP Core Network 408. It supports: access to 3GPP Core Network 408 functions and APIs for retrieval of network capability information, e.g. via SCEF and NEF APIs as defined in 3GPP TS 23.501, 3GPP TS 23.502, 3GPP TS 29.522, 3GPP TS 23.682, 3GPP TS 29.122; or with EAS 402 deployed within the MNO trust domain (see 3GPP TS 23.501 clause 5.13, 3GPP TS 23.682). Link EDGE-7 may reuse 3GPP reference points or interfaces of EPS or 5GS considering different deployment models.

Link EDGE-8 may be a reference point which enables interactions between the ECS 404 and the 3GPP Core Network 408. It supports: a) access to 3GPP Core Network 408 functions and APIs for retrieval of network capability information, e.g. via SCEF and NEF APIs as defined in 3GPP TS 23.501, 3GPP TS 23.502, 3GPP TS 29.522, 3GPP TS 23.682, 3GPP TS 29.122; and with the ECS 404 deployed within the MNO trust domain (see 3GPP TS 23.501 clause 5.13, 3GPP TS 23.682). Link EDGE-8 may reuse 3GPP reference points or interfaces of EPS or 5GS considering different deployment models.

The AC 406 may send an inquiry to the EES 403 through the EEC 407, to discover the suitable EASs. In this inquiry, the AC 406 includes EAS discovery filters that define the desired characteristics of the suitable EAS. In the response, the EEC 407 provides the AC 406 the list of matching EASs and some of their characteristics. The AC 406 then selects the best EAS from the list.

Figure 5:
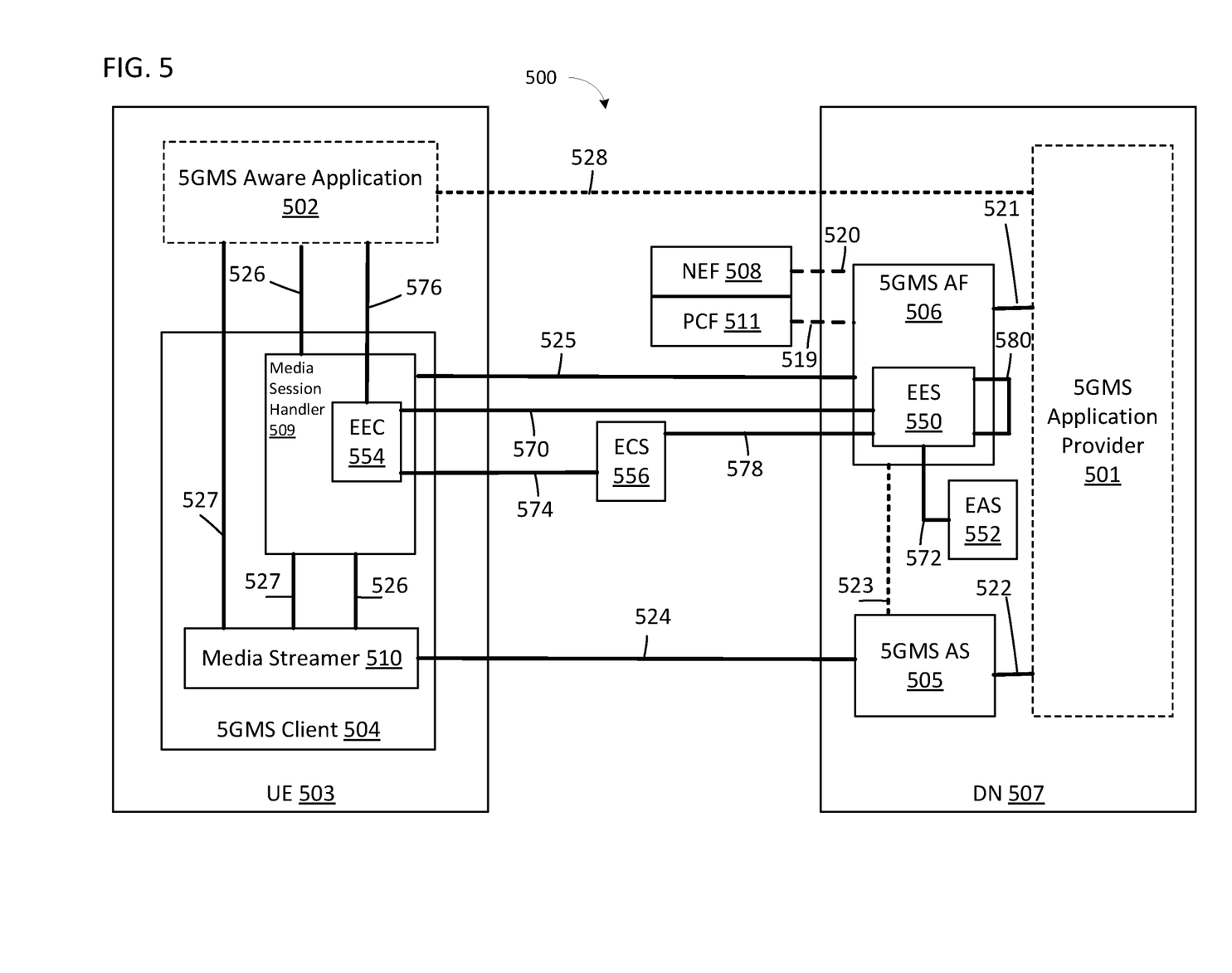
FIG. 5 is a diagram of a 5G media streaming architecture for enabling edge applications, according to embodiments.

FIG. 5 is a diagram of a 5G media streaming architecture 500 with edge extensions for enabling edge applications, according to embodiments. The 5GMS Application Provider 501, 5GMS Aware Application 502, UE 503, 5GMS client 504, 5GMS AS 505, 5GMS AF 506, DN 507, NEF 508, media session handler 509, media streamer 510, and PCF 511, along with interfaces M1 521, M2 522, M3 523, M4 524, M5 525, M6 526, M7 527, M8 528, N5 519 and N33

520 are similar to their counterparts in FIG. 3 and therefore the detailed description of these components will be omitted.

The architecture 500 includes an EES 550 as part of the 5GMS AF 506, an EAS 522 on the DN 507, an EEC 554 as part of the media session handler 509, and an ECS 556. The EEC 554 is connected to the EES 550 by the Edge-1 interface 570. The EAS 552 is connected to the EES 550 by the Edge-3 interface 572. The EEC 554 is connected to the ECS 556 by the Edge-4 interface 274. The EEC 554 is connected to the 5GMS Aware Application 502 by the Edge-5 interface 576. The ECS 556 is connected to the EES 550 by the Edge-6 interface 578. Lastly, the Edge-9 interface 580 is connected to the EES 550.

In FIG. 5, the 5GMS Application Provider (AS) requests to 5GMS AF the provisioning of the session using the M1 interface. Then, through the same interface, AP requests provisioning of different session features including server certificate, content preparation, content hosting configuration, reporting, consumption reporting, policy, and others.

In FIG. 5, the 5GMS Application Provider (AS) requests to 5GMS AF the provisioning of the session using the M1 interface. Then, through the same interface, AP requests provisioning of different session features including server certificate, content preparation, content hosting configuration, reporting, consumption reporting, policy, and others.

As discussed above, the current 5G Edge architecture defined in 3GPP TS23.558 only defines the discovery of the edge application by Application clients. The 3GPP TS26.501 only defines the media streaming architecture. It recently added the use of TS23.558 edge architecture as part of the 5GMSA architecture as an extension. However, the actual method of provisioning such services is not defined.

Accordingly, embodiments of the present disclosure provide a provisioning method of new edge servers based on the triggering events of the running edge servers.

Aspects of the present disclosure are directed to extending the 5GMS M1 interface. Embodiments of the present disclosure enable setting events for an existing EAS servers so that when the EAS profile reaches certain conditions, one or more events are issued. Embodiments of the present disclosure enable subscribing and receiving events from another EAS server for activating a new EAS server.

The EAS properties are defined by its profile known as EASProfile in 29.558. The EAS profile may change during its operation. Some of those service KPIs are defined as follows.

TABLE 1

Definition of type EASServiceKPI

| Attribute name | Data type | P | Cardinality | Description |
| --- | --- | --- | --- | --- |
| maxReqRate | string | O | 0 . . . 1 | Maximum request rate from the Application Client supported by the EAS. |
| maxRespTime | Uinteger | O | 0 . . . 1 | The maximum response time, in the units of milliseconds, advertised for the AC's service requests. This includes the round trip time of the request and response packet, the processing time at the EAS and time required by EAS to consume any 3 GPP core network capabilities. |

TABLE 1-continued

Definition of type EASServiceKPI

| Attribute name | Data type | P | Cardinality | Description |
| --- | --- | --- | --- | --- |
| avail | string | O | 0 . . . 1 | Advertised percentage of time the server is available for the AC's use. |
| avlComp | string | O | 0 . . . 1 | The maximum compute resource available for the AC. |
| avlGraComp | string | O | 0 . . . 1 | The maximum graphical compute resource available for the AC. |
| avlMem | string | O | 0 . . . 1 | The maximum memory resource available for the AC. |
| avlStrg | string | O | 0 . . . 1 | The maximum storage resource available for the AC. |
| connBand | BitRate | O | 0 . . . 1 | The connection bandwidth in Kbit/s advertised for the AC's use. |

Embodiments of the present disclosure defines events based on one or more KPI parameters, including the KPI parameters from Table 1. If one or more parameters reach a certain value, the 5GMS AS/EAS may generate a corresponding event. That event can be collected using Data collection AF.

The 5GMS Application Service Provider (AP) may set an event trigger condition when it provisions a new EAS. The event trigger condition can be carried in the activation trigger parameter. In an embodiment, events may be set by adding a parameter to the EdgeResourcesConfiguration document and/or descriptor. In an embodiment, the 5GMS Application Service Provider sets an event trigger condition when it provisions a new EAS. The event trigger condition can be carried in the activation trigger parameter. As an example, a new property and/or parameter known as "TriggeringEvents" may be added to the EdgeResourcesConfiguration resource as detailed in Table 2 below.

TABLE 2

Definition of EdgeResourcesConfiguration resource

| Property name | Type | Cardinality | Description |
| --- | --- | --- | --- |
| edgeResourcesConfigurationId | ResourceId | 1 . . . 1 | An identifier for this Metrics Reporting Configuration that is unique within the scope of the enclosing Provisioning Session. |
| edgeManagement Mode | EdgeManagmentType | 1 . . . 1 | Indicates if the management of the edge resource session is client-driven or application provider-driven. |
| activationTrigger | ActivationTrigger Type | 0 . . . 1 | Condition to activate edge resources for this ProvisioningSession. |
| TriggeringEvents | TriggerEvents | 0 . . . 1 | Condition for triggering events in this provision Session. |

TABLE 2-continued

Definition of EdgeResourcesConfiguration resource

| Property name | Type | Cardinality | Description |
|---|---|---|---|
| profile | EASProfile | 1 . . . 1 | The EAS profile used by the 5 GMS AF or by the EEC to discover and select one or more EAS instances to serve media streaming sessions. The format of the EASProfile is defined in table 8.1.5.2.3-1 of TS 29.558. |
| application Context Relocation Requirements | ACRRequirements Type | 0 . . . 1 | Application Context Relocation tolerance and requirements. |

In the same or another embodiment, the events may be set using the event provisioning API (R1).

According to an aspect, a 5GMS Application Provider may set up the conditions for starting a new edge server by the 5GMS AF. The Application Provider may set the conditions for generating events in a running edge server E1 during creation or updating the provisioning of the edge server through the M1 interface. The Application Provider may also set the activation conditions for activating a new edge server E2 during the creation or updating the provisioning of the edge server through the M1 interface. The 5GMS AF may subscribe to the events defined by E1 during its provisioning. When any of the conditions in E1 reaches the set limits or any conditions are satisfied, the 5GMS AF/EAS may issue an event. In some embodiments, since the 5GMS AF may be subscribed to the E1 events, it receives the event issued by E1. The 5GMS AF may check that the received specific event meets any activation condition for E2. If that condition is met, the 5GMS AF may activate the E2 server.

Figure 6:
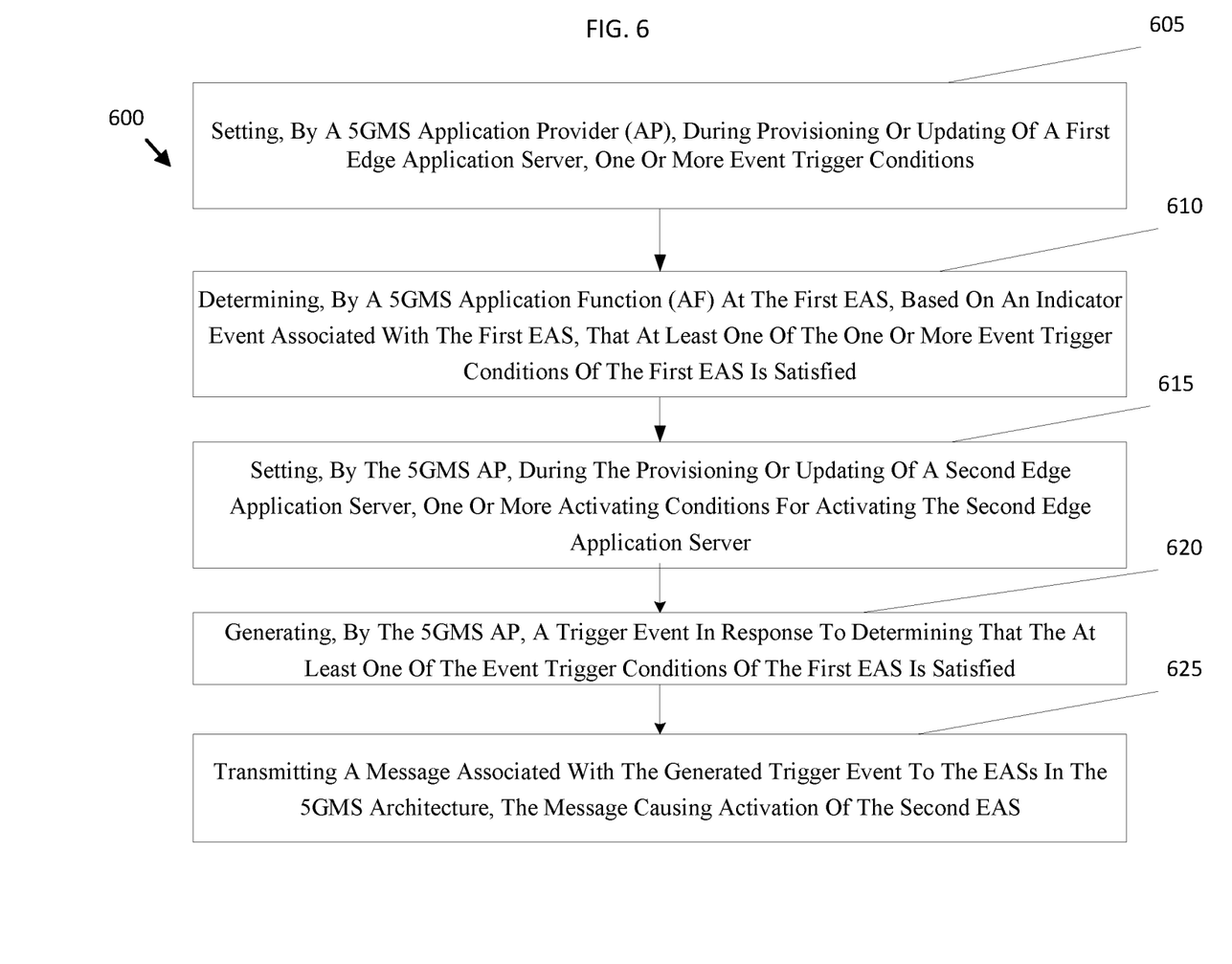
FIG. 6 is a flowchart of an example process for event-driven provisioning of edge servers in a media-streaming network.

FIG. 6 is a flowchart of an example process 600 for event-driven provisioning of edge servers in a 5G media streaming network.

At operation 605, during provisioning or updating of a first edge application server, a 5GMS application provider (AP) may set one or more event trigger conditions. In some embodiments, the one or more event trigger conditions may be based on one or more dynamic parameters of the first edge application server. In some embodiments, the one or more event trigger conditions may be based on a maximum request rate from an application client (AC) supported by the first edge application server. The one or more event trigger conditions may be based on a maximum response time advertised for service requests by an application client (AC). In some embodiments, the one or more event trigger conditions may be based on at least one of a maximum percentage of time available on the first edge application server for use by an application client (AC), a maximum compute resource available on the first edge application server for use by the AC, a maximum graphical compute resource available on the first edge application server for use by the AC, a maximum memory resource available on the first edge application server for use by the AC, a maximum storage resource available on the first edge application server for use by the AC, or a maximum connection bandwidth available on the first edge application server for use by the AC.

At operation 610, an indicator event associated with the first edge application server, may be determined by a 5GMS Application Function (AF), based on an indicator event associated with the first EAS, that at least one of the event trigger conditions of the first EAS is satisfied. The determining may include issuing, by the first edge application server, a trigger event indicating that at least one of the one or more event trigger conditions of the first edge application server is satisfied, and listening, by the 5GMS AF, for the trigger event of the first edge application server.

At operation 615, during the provisioning or updating of a second edge application server, the 5GMS AP may set one or more activating conditions for activating the second edge application server. In some embodiments, the one or more activating conditions may be set based on adding a triggering events parameter to an edge resources configuration descriptor. In some embodiments, the one or more activating conditions may be set using an event provisioning application programming interface (API).

At operation 620, the 5GMS AP may generate a trigger event in response to determining that the at least one of the event trigger conditions of the first EAS is satisfied.

At operation 625, the 5GMS AP, that the generated trigger event is associated with at least one of the activating conditions for activating the second EAS and/or the second edge application server may be activated based on a message associated with the generated trigger event to the EASs in the 5GMS architecture, the message causing activation of the second EAS.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for event-driven provisioning of edge application servers in a 5G Media Streaming (5GMS) architecture, the method being executed by at least one processor, the method comprising:
    setting, by a 5GMS application provider (AP), during provisioning or updating of a first edge application server (EAS), one or more event trigger conditions;
    determining, by a 5GMS Application Function (AF) at the first EAS, based on an indicator event associated with the first EAS, that at least one of the one or more event trigger conditions of the first EAS is satisfied, wherein the determining by the 5GMS AF comprises:
        issuing, by the first EAS, a trigger event indicating that at least one of the one or more event trigger conditions of the first EAS is satisfied, and
        listening, by the 5GMS AF, to the trigger event of the first EAS;
    generating, by the 5GMS AP, a trigger event in response to determining that the at least one of the event trigger conditions of the first EAS is satisfied;
    setting, by the 5GMS AP, during the provisioning or updating of a second EAS, one or more activating conditions for activating the second EAS;
    determining, by the 5GMS AP, that the generated trigger event is associated with at least one of the one or more activating conditions for activating the second EAS; and
    transmitting a message associated with the generated trigger event to EASs in the 5GMS architecture, the message causing activation of the second EAS.

2. The method of claim 1, wherein the one or more activating conditions are set based on adding a triggering events parameter to an edge resources configuration descriptor.

3. The method of claim 1, wherein the one or more activating conditions are set using an event provisioning application programming interface (API).

4. The method of claim 1, wherein the one or more event trigger conditions are based on one or more dynamic parameters of the first EAS satisfying one or more respective criteria.

5. The method of claim 4, wherein the one or more event trigger conditions are based on a maximum request rate from an application client (AC) supported by the first EAS.

6. The method of claim 4, wherein the one or more event trigger conditions are based on a maximum response time advertised for service requests by an application client (AC).

7. The method of claim 4, wherein the one or more event trigger conditions are based on at least one of a maximum percentage of time available on the first EAS for use by an application client (AC), a maximum compute resource available on the first EAS for use by the AC, a maximum graphical compute resource available on the first EAS for use by the AC, a maximum memory resource available on the first EAS for use by the AC, a maximum storage resource available on the first EAS for use by the AC, or a maximum connection bandwidth available on the first EAS for use by the AC.

8. A device for event-driven provisioning of edge servers in a 5G Media Streaming (5GMS) architecture, the device comprising:
    at least one memory configured to store program code; and
    at least one processor configured to read the program code and operate as instructed by the program code, the program code including:
        first setting code configured to cause the at least one processor to set, by a 5GMS application provider (AP), during provisioning or updating of a first edge application server (EAS), one or more event trigger conditions;
        first determining code configured to cause the at least one processor to determine, by a 5GMS Application Function (AF) at the first EAS, based on an indicator event associated with the first EAS, that at least one of the one or more event trigger conditions of the first EAS is satisfied, the first determining comprising:
            issuing code configured to cause the at least one processor to issue, by the first EAS, a trigger event indicating that at least one of the one or more event trigger conditions of the first EAS is satisfied, and
            listening code configured to cause the at least one processor to listen, by the first 5GMS AF, to the trigger event of the first EAS;
        generating code configured to cause the at least one processor to generate, by the 5GMS AP, a trigger event in response to determining that the at least one of the event trigger conditions of the first EAS is satisfied;
        second setting code configured to cause the at least one processor to set, by the 5GMS AP, during the provisioning or updating of a second EAS, one or more activating conditions for activating the second EAS;
        second determining code configured to cause the at least one processor to determine, by the 5GMS AP, that the generated trigger event is associated with at least one of the one or more activating conditions for activating the second EAS;
        transmitting code configured to cause the at least one processor to transmit a message associated with the generated trigger event to EASs in the 5GMS architecture, the message causing activation of the second EAS.

9. The device of claim 8, wherein the one or more activating conditions are set based on adding a triggering events parameter to an edge resources configuration descriptor.

10. The device of claim 8, wherein the one or more activating conditions are set using an event provisioning application programming interface (API).

11. The device of claim 8, wherein the one or more event trigger conditions are based on one or more dynamic parameters of the first EAS satisfying one or more respective criteria.

12. The device of claim 11, wherein the one or more event trigger conditions are based on a maximum request rate from an application client (AC) supported by the first EAS.

13. The device of claim 11, wherein the one or more event trigger conditions are based on a maximum response time advertised for service requests by an application client (AC).

14. The device of claim 11, wherein the one or more event trigger conditions are based on at least one of a maximum percentage of time available on the first EAS for use by an application client (AC), a maximum compute resource available on the first EAS for use by the AC, a maximum graphical compute resource available on the first EAS for use by the AC, a maximum memory resource available on the first EAS for use by the AC, a maximum storage resource available on the first EAS for use by the AC, or a maximum connection bandwidth available on the first EAS for use by the AC.

15. A non-transitory computer-readable medium storing instructions, the instructions comprising: one or more instructions that, when executed by one or more processors of a device for event-driven provisioning of edge servers in a 5G Media Streaming (5GMS) architecture, cause the one or more processors to:
    set, by a 5GMS application provider (AP), during provisioning or updating of a first edge application server (EAS), one or more event trigger conditions;
    determine, by a 5GMS Application Function (AF) at the first EAS, based on an indicator event associated with the first EAS, that at least one of the one or more event trigger conditions of the first EAS is satisfied, wherein the determining by the 5GMS AF comprises:
        issuing, by the first EAS, a trigger event indicating that at least one of the one or more event trigger conditions of the first EAS is satisfied, and
        listening, by the 5GMS AF, to the trigger event of the first EAS;
    generate, by the 5GMS AP, a trigger event in response to determining that the at least one of the event trigger conditions of the first EAS is satisfied;
    set, by the 5GMS AP, during the provisioning or updating of a second EAS, one or more activating conditions for activating the second EAS;
    determine, by the 5GMS AP, that the generated trigger event is associated with at least one of the one or more activating conditions for activating the second EAS; and
    transmit a message associated with the generated trigger event to EASs in the 5GMS architecture, the message causing activation of the second EAS.

16. The non-transitory computer-readable medium of claim 15, wherein the one or more activating conditions are set based on adding a triggering events parameter to an edge resources configuration descriptor.

17. The non-transitory computer-readable medium of claim 15, wherein the one or more activating conditions are set using an event provisioning application programming interface (API).

18. The non-transitory computer-readable medium of claim 15, wherein the one or more event trigger conditions are based on one or more dynamic parameters of the first EAS satisfying one or more respective criteria.

\* \* \* \* \*